(12) United States Patent
Khalifa

(10) Patent No.: US 10,782,052 B2
(45) Date of Patent: Sep. 22, 2020

(54) MICRO ENVIRONMENTAL CONTROL SYSTEM

(71) Applicant: Hussein Ezzat Khalifa, Manlius, NY (US)

(72) Inventor: Hussein Ezzat Khalifa, Manlius, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 0 days.

(21) Appl. No.: 15/507,065

(22) PCT Filed: Aug. 26, 2015

(86) PCT No.: PCT/US2015/046859
§ 371 (c)(1),
(2) Date: Feb. 27, 2017

(87) PCT Pub. No.: WO2016/033142
PCT Pub. Date: Mar. 3, 2016

(65) Prior Publication Data
US 2017/0276408 A1    Sep. 28, 2017

Related U.S. Application Data

(60) Provisional application No. 62/091,728, filed on Dec. 15, 2014, provisional application No. 62/042,012, filed on Aug. 26, 2014.

(51) Int. Cl.
*F25B 21/02* (2006.01)
*F25B 13/00* (2006.01)

(52) U.S. Cl.
CPC ............. *F25B 21/02* (2013.01); *F25B 13/00* (2013.01); *F25B 2313/0293* (2013.01); *F25B 2339/042* (2013.01); *F25B 2400/24* (2013.01)

(58) Field of Classification Search
CPC .. F25B 21/02; F25B 1/00; F25B 49/02; F25B 27/005; F25B 39/00; F25B 7/00;
(Continued)

(56) References Cited

U.S. PATENT DOCUMENTS 5,575,159 A    11/1996  Dittell
6,481,213 B2   11/2002  Carr et al.
(Continued)

FOREIGN PATENT DOCUMENTS

CA    2147203 A1    10/1996
CN    103759472 A  *  4/2014
(Continued)

OTHER PUBLICATIONS

International Search Report Form PCT/ISA/220, International Application No. PCT/US2015/046859, pp. 1-7, dated Nov. 24, 2015.
(Continued)

*Primary Examiner* — Emmanuel E Duke
(74) *Attorney, Agent, or Firm* — Bond Schoeneck and King PLLC; David Nocilly

(57) ABSTRACT

A micro environmental control system that can remove or add 30W from or to the near range personal microenvironment of a user. For cooling, the µX uses a micro vapor compression system during the un-occupied period to freeze a phase-change-material in a thermal storage module. A fan then moves air over the phase-change-material to deliver cooled air. Heating is delivered by a small electric heater integrated into a condensing unit. The resulting system is inexpensive to build and uses a limited amount of energy.

12 Claims, 9 Drawing Sheets

(58) Field of Classification Search
CPC ...... F25B 13/00; F25B 40/02; F25B 2400/24; F25B 2313/0293; F25B 2339/042; F28D 20/02; F25D 16/00; F24D 11/02
USPC .............................................. 62/113; 165/41
See application file for complete search history.

(56) References Cited

U.S. PATENT DOCUMENTS

| | | | |
|---|---|---|---|
| 7,426,835 B2 | 9/2008 | Bell et al. | |
| 9,234,683 B2 | 1/2016 | Creed et al. | |
| 2002/0043068 A1 | 4/2002 | Carr | |
| 2002/0125001 A1* | 9/2002 | Kelly | F28F 7/02 165/165 |
| 2003/0014987 A1* | 1/2003 | Levenduski | F28D 20/028 62/185 |
| 2003/0029173 A1 | 2/2003 | Bell | |
| 2003/0131623 A1* | 7/2003 | Suppes | F25B 30/02 62/324.1 |
| 2004/0244398 A1* | 12/2004 | Radermacher | B01D 5/0039 62/285 |
| 2005/0144968 A1* | 7/2005 | Shakespeare | F25B 13/00 62/298 |
| 2005/0234597 A1* | 10/2005 | Harrod | F24F 11/30 700/276 |
| 2009/0025404 A1* | 1/2009 | Allen | F25B 39/02 62/113 |
| 2011/0005245 A1* | 1/2011 | Pussell | F25B 30/02 62/89 |
| 2012/0037342 A1* | 2/2012 | Holloway | F24F 5/0021 165/104.13 |
| 2012/0152511 A1* | 6/2012 | Chang | B60H 1/00428 165/202 |
| 2012/0160446 A1* | 6/2012 | Creed | B60H 1/00207 165/41 |
| 2014/0130536 A1* | 5/2014 | Joppolo | F25B 40/02 62/335 |
| 2015/0135743 A1* | 5/2015 | Dobbs | F24F 11/30 62/115 |

FOREIGN PATENT DOCUMENTS

| | | |
|---|---|---|
| DE | 1301454 B | 8/1969 |
| WO | 2013052468 | 4/2013 |

OTHER PUBLICATIONS

Supplementary European Search Report Form 1503, International Application No. PCT/US15146859, pp. 1-8, dated Aug. 26, 2015.

* cited by examiner

MICRO ENVIRONMENTAL CONTROL SYSTEM

CROSS-REFERENCE TO RELATED APPLICATIONS

The present invention claims priority to U.S. Provisional Application No. 62/042,012, filed on Aug. 26, 2014 and U.S. Provisional Application No. 62/091,728, filed on Dec. 15, 2014.

This invention was made with government support under Grant No. DE-AR0000526 awarded by the Department of Energy (DOE). The government has certain rights in the invention.

BACKGROUND OF THE INVENTION

1. Field of the Invention

The present invention relates to environmental control systems and, more particularly, to a control system for a micro environment.

2. Description of the Related Art

Personal environmental control systems (PECS) have been developed in university laboratories but, with very few exceptions, generally have not become commercial because of complexity, intrusiveness, or high power usage. Most system rely on tapping into the building air supply, requiring unsightly ducting to the ceiling or access to relatively uncommon underfloor air supply plenums. The few commercial available systems, such as the now-discontinued Johnson Control's Personal Environment Module (PEM) and Exhausto's Personal Ventilation Device, require such connections to the building air supply, such as via an under-floor plenum. Most of these systems are aimed at improving breathing zone air quality and not energy savings or comfort. These systems are also often noisy and require alteration of office furniture. Recently, there is an increasing interest in using PECS to condition the local personal microenvironment while raising the background room temperature during the cooling season or lowering it during the heating season to save energy.

BRIEF SUMMARY OF THE INVENTION

The present invention comprises a micro environmental control system ($\mu$X) that will remove or add 50-100 W from or to the near range personal microenvironment. Such a system may be used to make a person comfortable when the surrounding background room temperature is increased in the summer and lowered in the winter to save energy. For cooling, the $\mu$X uses a micro vapor compression system ($\mu$VCS) that is operated to freeze a phase-change-material in a thermal storage module during the night in the cooling season. In the cooling season, one or more small fans move warm room air over the phase-change-material to deliver cooled air to a user. In the heating season, heat may be delivered by a small electric heater integrated into the $\mu$VCS's condensing unit, or the $\mu$VCS can be operated during the occupancy period as a heat pump to freeze the PCM while delivering warm air to the occupant by blowing air over the $\mu$VCS's condenser. In the heat pump mode, the $\mu$VCS is operated in reverse to melt the frozen PCM by pumping heat from the room air. The system is self-contained, automated, and designed to be installed under a desk.

In a first embodiment of a system according to the present invention, the $\mu$VCS comprises a compressor, a condenser coupled to the compressor, an expansion valve coupled to the condenser, a thermal storage module including an embedded evaporator coupled to the expansion valve and a phase change material surrounding the evaporator, and one or more fans positioned to selectively direct a stream of air through the phase change material or over the condenser. A controller is coupled to the compressor and the fan(s) and is programmed to operate the system in a cooling mode wherein the $\mu$VCS is operated to freeze the phase change material during a first predetermined time period, and the fan is operated to direct a stream of room air through the phase change material during a second predetermined time period. The first predetermined time period is during the night and the second predetermined time period is during the day so that the phase change material is frozen at night and then used for cooling during the daytime without the need to run the compressor. In the heating season, a heater may be associated with the condenser to provide heating during the day with the controller is programmed to operate the system in a heating mode where the fan directs air over the heater. Preferably, a set of dampers is associated with the fan to selectively direct the stream of air through the phase change material or over the condenser. In another embodiment, a reversing valve is employed and the controller is coupled to the reversing valve, the compressor, and the fan to operate the system in a heat-pump mode wherein the $\mu$VCS is operated to freeze the phase change material during a first predetermined time period, and the fan is operated to direct the stream of air through the phase change material during a second predetermined time period. In this heat pumping mode, the first predetermined period is during the day wherein the controller is programmed to operate the system in a heating mode and the fan is operated to direct room air over the warm condenser to deliver heat to the occupant. At night, the cycle is reversed via the reversing valve, allowing the $\mu$VCS to melt the frozen PCM.

The method of providing micro environmental control according to the present invention involves the step of providing a micro vapor compression system having a compressor, a condenser coupled to the compressor, an expansion valve coupled to the condenser, a thermal storage module including an embedded evaporator coupled to the expansion valve and a phase change material surrounding the evaporator, and one or more fans positioned to selectively direct a stream of air through the phase change material or over the condenser. The method then comprises operating the system in a cooling mode by cooling the phase change material during a first predetermined time period, and using the fan to direct the stream of air through the phase change material during a second predetermined time period. The method may further include the step of providing a heater associated with the condenser as part of the unit and operating the unit in a heating mode where the fan directs air over the heater. Alternatively, the expansion valve may be a reversing valve with the unit operated in a cooling mode where compressor is operated to cool the phase change material during a first predetermined time period and the fan is operated to direct the stream of air through the phase change material during a second predetermined time period, and a heating mode wherein the fan is operated to direct the stream of air over the compressor.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
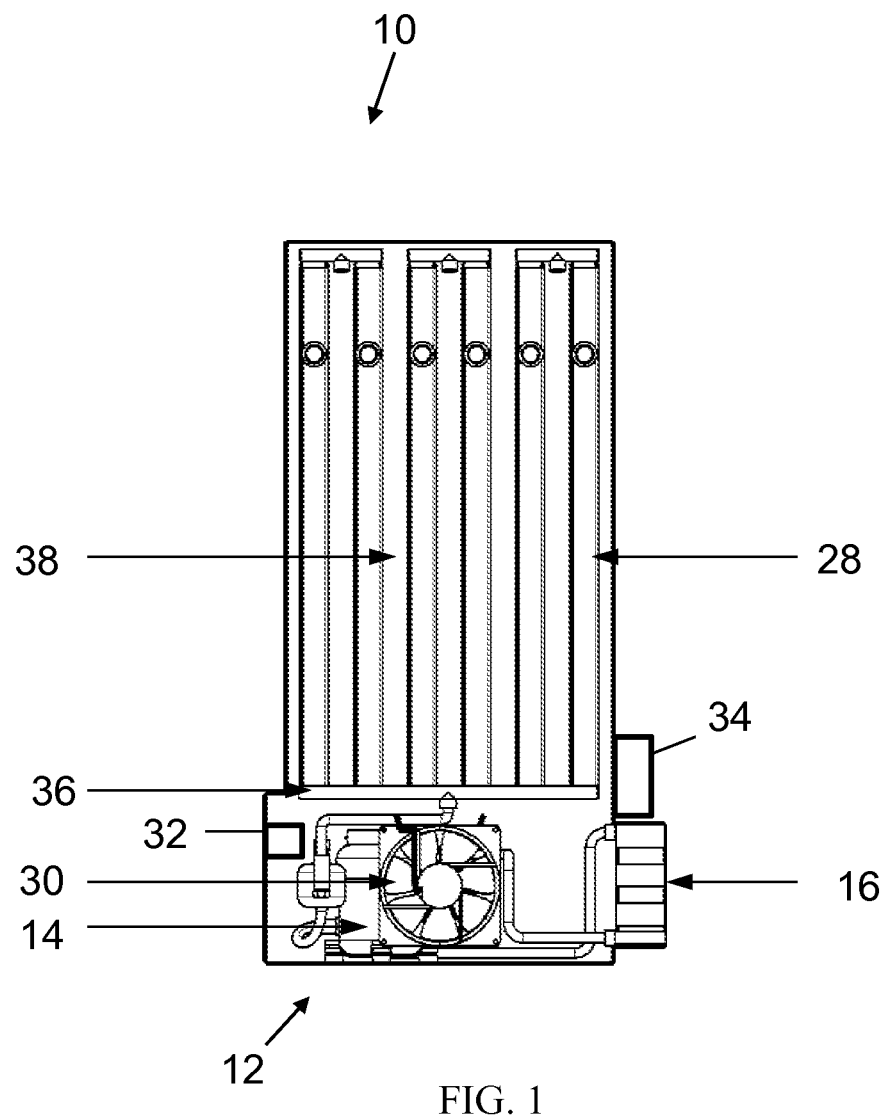
FIG. 1 is a schematic of a micro environmental control system according to the present invention.

Referring now to the drawings, wherein like reference numerals refer to like parts throughout, there is seen in FIG. 1 a micro environmental control system (μX) that will control the temperature in the near range personal microenvironment (PμE) of a user. The μX is self-contained, automated, and designed to be installed under a desk, as seen in FIG. 1, although other configurations of the μX should be apparent to those of skill in the art. In particular, system 10 comprises a self-contained micro vapor compression system (μVCS) unit 12 having a compressor 14, a condenser 16 coupled to the compressor 14 and an expansion valve 20 coupled to condenser 16 to form a vapor compression cooling system. An evaporator 22 is coupled to expansion valve 24. Unit 12 further includes a thermal storage module 26 having a phase change material (PCM) 28 surrounding evaporator 22 and a fan 30 for selectively directing a stream of air through the phase change material or over the condenser. A controller 32 is coupled to compressor 18 and fan 30 for operating system 10. For example, controller 32 may be programmed to operate the system in a cooling mode wherein system 10 is operated to cool phase change material 28 during a first predetermined time period, and fan 30 is operated to direct the stream of room air through air passages 38 passing through phase change material 28 during a second predetermined time period. For example, during periods when cooling is desired by a user of unit 12 during the day, the first predetermined time period is during the night and the second predetermined time period is during the day. If warming is desired, unit 12 may also include a heater 34 with controller 32 programmed to operate the system in a heating mode where fan 30 directs air over heater 34. A set of dampers 36 may be provided in unit 12 to selectively direct the stream of air through the PCM module 28, over condenser 16, or through heater 34 (if part of the system).

In an alternative embodiment, heater 34 may be omitted by programming the controller 32 to operate the μVCS unit 12 during the day as a heat pump, drawing heat from molten PCM 28 to freeze it, while using fan(s) 30 to blow room air over the condenser 16 and delivering warm air to the occupant, rather than passing the through an already frozen PCM module to deliver cool air to the occupant, as practiced in the cooling mode. In a heat pump mode, a reversing valve (not shown) reverses the flow of the refrigerant, allowing the condenser 16 to operate as an evaporator and the evaporator embedded in the PCM module 28 to act as a condenser melting the PCM that has been frozen during daytime μVCS operation.

Thus, unit 12 may be provided in a micro environmental location, such as under a desk 40 in an office, and operated in a cooling mode by cooling phase change material 28 during a first predetermined time period, such as the nighttime when no one is in the office, and then using fan 34 to direct the stream of air through phase change material 28 during a second predetermined time period, such as the daytime when a user desires cooled air in the office. Alternatively, if warm air is desired, fan 30 may be operator by controller 32 and used to blow air over heater 34, over the condenser 16 in the heat pump mode.

EXAMPLE 1

An exemplary μX will provide less than 100 W of cooling to the PμE around a seated occupant during the cooling season, or provide up to 100 W of heating to the PμE in the heating season for up to 10 hours of occupancy in a typical office setting. The invention provides efficient comfort to the occupant in an environment that, in order to reduce overall building heating, ventilating and air-conditioning (HVAC) energy consumption, is kept too warm for comfort in the summer season and too cold for comfort in the winter season.

For cooling, the μVCS will be operated automatically only during the un-occupied period to freeze a phase-change-material (PCM) in a thermal storage module. One or more fans move ~0.4 cfm of air per watt of cooling over the PCM to deliver air at ~71° F. to the PμE during occupancy period. Cooled air will be delivered to the PμE, especially close to the person's upper body and head, through one of several optional air terminal devices (ATD).

Heating may be delivered by a small electric heater integrated into the μVCS condensing unit and preferably operated only during occupancy periods to supply warm air to the PμE during the heating season. The μX is self-contained, automated, and designed to be installed under a desk, as seen in FIG. 1, although other configurations of the μX should be apparent to those of skill in the art. A μX designed to deliver ~50 W of cooling during 10 hours of occupancy in the cooling season (500 W-h of total cooling) will consume less than 100 W-h of electricity during the combined night and day freezing and melting cycles.

In such a system, the PCM module is preferably sized to provide ~50 W of cooling over an 10-hour occupancy period. Several inorganic (e.g., salt hydrates) and organic (e.g., paraffins) PCMs with freezing points in the desired 63-66° F. range and with latent heats in excess of 170 kJ/kg are available in bulk or encapsulated form. Other PCMs may be investigated, selected and optimized.

Figure 2:
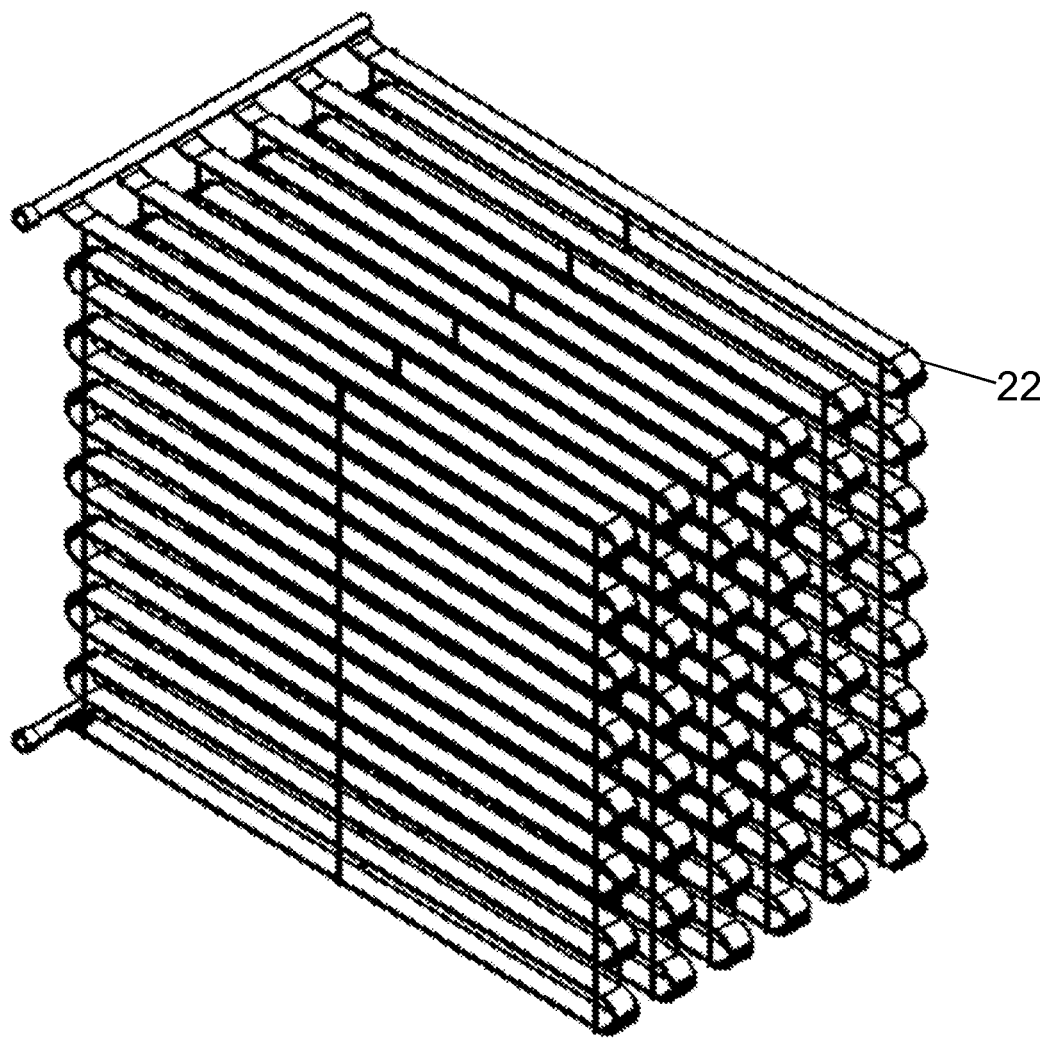
FIG. 2 is a schematic of the evaporator tubes for a micro environmental control system according to the present invention.

The evaporator tubes of the μVCS are fully embedded in the PCM as illustrated in FIG. 2. Given the high heat transfer coefficient of the boiling refrigerants inside the tubes, the evaporator saturation temperature in this configuration should be only slightly lower than the freezing point of the PCM, i.e., $T_e \sim 61\text{-}63°$ F. Not only will this help achieve a higher Coefficient of Performance (COP), but embedding the evaporator tubes in the PCM and maintaining the saturated evaporator temperature close to 63° F. will also prevent condensation of indoor moisture on the evaporator coils.

Multiple refrigerants may be tested for use with the invention, such as those widely used in household refrigerators (e.g., R134a), and other refrigerants such as R245fa and R1233zd, or hydrocarbon refrigerants such as iso-pentane (R601a). The condenser of the μVCS will be cooled by room air at the background temperature of 79° F. Therefore, a condenser saturation temperature of <100° F. is reasonable. The same fan(s) employed for moving the air through the PCM module during occupied period can also be used for moving the room air over the condenser at night. Preliminary analysis indicates that a cooling COP >5 is achievable, even with a compressor that is only 45% efficient, which is much higher than the ~0.5 COP of a Peltier Thermo-electric cooler operating under similar conditions. Given the near constancy of evaporator and condenser temperatures, this application is especially suitable for a constant-volume-ratio compressor e.g., scroll compressor.

In the configuration of FIG. 1, air flows in gaps between slabs of the PCM encased in aluminum or plastic. Approximately 20 cfm of air (approximately 0.4 cfm per watt of cooling) flows through the PCM module gaps using a low-power (<1 W) quiet fan. The air is drawn from the room at room temperature (~79° F.), cooled by the PCM to about 71° F., and then emerges from the PCM module at a low velocity of <1 ft/s. Suitable ducting and air terminal devices may be employed to deliver the cooled air to effect near-range control of the PμE.

In the cooling mode, the μVCS will start automatically and run for a few hours (for example, 5 hours) during the un-occupied night-time to freeze the PCM (store cooling in it). In this operating mode, the air blown by the fans will be directed at the condenser of the μVCS to reject its heat into the unoccupied space; a set of automatic dampers will allow room air to flow over the μVCS condenser, and another synchronized set of automatic dampers will block room air blown by the fans from entering the PCM module while the μVCS is operating. The μVCS will automatically shut down before the person starts work in the morning. When the person sits at his/her desk, the system will automatically turn on the fans and direct the air to flow through passages in the PCM module, and thereby cool it before delivering it to the PμE through the ATD. During occupancy, the PCM module dampers will be automatically opened and those of the condenser will be automatically closed, thus forcing warm room air to flow through passages inside the PCM module and be cooled by melting the PCM over a 10-hour period. During the cooling season, the μVCS may only be operated during un-occupied period to freeze the PCM so that the warm air discharged from the μVCS will not degrade personal comfort. Further, by operating the μVCS only during the un-occupied period, compressor and fan noise will not be an issue.

In the heating mode, room air will be blown over the electric heater and delivered to the PμE during 10 hours of occupancy. The PCM dampers will be automatically closed and the condenser/heater dampers will be automatically opened with the fans blowing room air over the heater to heat the air to a more comfortable level.

Although the μX is designed for automatic operation, the occupant can override the μX automation and operate the system to his/her liking. The system can also automatically turn on the μVCS at night to "charge" the PCM, and shut it off in the early morning hours. The system can turn on the fan to move the air through the PCM module (μVCS is not operational) on a programmed schedule or upon detecting the presence of a person at the desk.

The use of the thermal storage PCM module in the μX allows us to shift the operation of the μVCS to the night hours when the building is not occupied. This avoids two of the major drawbacks of installing an active vapor compression cooling device very close to the occupant: 1) hot exhaust from the condenser of the vapor compression system will not be discharged into the occupied space during occupancy, thus avoiding further thermal discomfort, and 2) distracting compressor noise is avoided during occupancy. Further, some utilities that employ time-of-day electricity pricing, may offer lower electric rates at night.

A strong advantage of the disclosed μX system is that, unlike the many personal ventilation or task-ambient systems, it does not require connection to the building HVAC infrastructure (air distribution or chilled/hot water). This makes it adaptable to a wide range of settings and building configurations. In fact μX can be used in combination with a diverse assortment of personal air delivery systems that traditionally rely on the availability of conditioned air from an underfloor plenum or through unsightly ducts descending from the much more-ubiquitous ceiling supply of conditioned air. Therefore ng them from dependence on underfloor air distribution.

The μX of the invention does not suffer from the shortcomings of other State of the Art (SoA) near-range systems and the μX can deliver the desired adjustments in the PμE quietly and with minimal use of energy.

Figure 3:
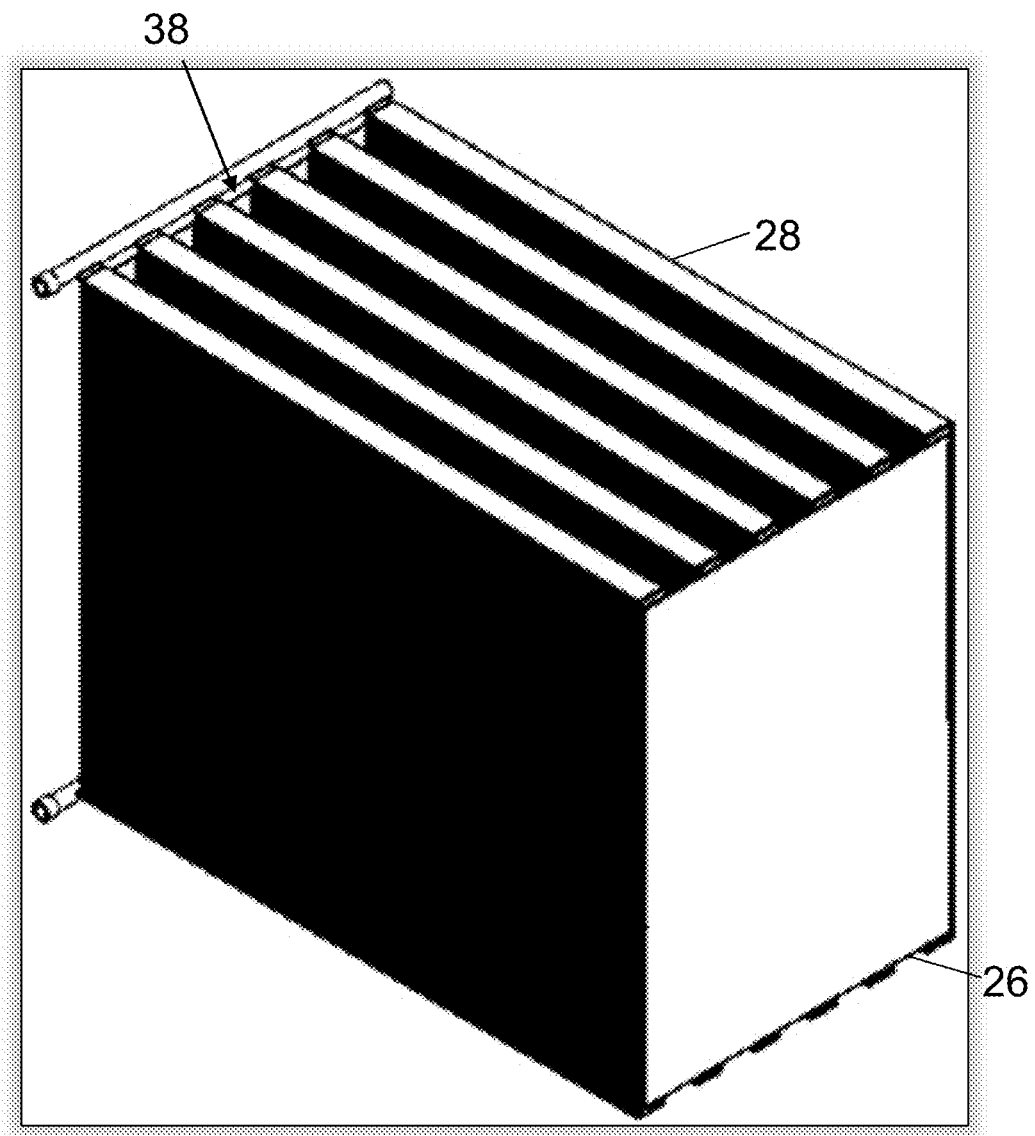
FIG. 3 is a schematic of a typical phase change material module for a micro environmental control system according to the present invention.

The PCM is selected from commercially available PCMs that melt and freeze between 60° F. and 66° F., such as paraffin waxes, which melt and freeze at ~64° F. FIG. 2 displays one possible configuration of the μVCS evaporator using serpentine micro-channel tubes. The evaporator tubes of the μVCS (FIG. 2) are embedded in the PCM module, as shown in FIG. 3. The PCM is encased in plastic or aluminum casings made in the form of slabs with the evaporator sections embedded in these slabs, and completely surrounded by the PCM, as seen in FIG. 3. The air flows in channels between the encased PCM slabs during the day to be cooled by the frozen PCM, causing it to melt. The freezing of the PCM during operation of the μVCS at night in the cooling mode will progress from the tube into the surrounding PCM, whereas the melting during the day in the cooling mode will progress from the outside inwards toward the center of the PCM slab.

Owing to the high heat transfer coefficient of the refrigerant forced-convection boiling inside the evaporator passages, the saturated evaporator temperature (SET) can be raised to a more-efficient ~60° F., ~3-4° F. lower than PCM freezing temperature. Not only will this allow for a higher and more efficient SET, but also it avoids the problem of indoor moisture condensation on the evaporator surface and associated condensate management challenges when the indoor dew point is higher than 61° F., as it is likely to be with a 79-80° F. indoor DBT and 60% RH. With the μVCS operating only at night when the space is not occupied, the condenser heat will be rejected into the 79-80° F. un-occupied space, allowing the saturated condenser temperature (SCT) to be lowered to a more-efficient 92-100° F. In this fashion, the coefficient of performance (COP) of the μVCS would be >5, much higher than the <1 COP of a Peltier thermo-electric cooler under similar operating conditions.

Analysis indicates that the use of the disclosed µX to provide 50 W of cooling to maintain an occupant's thermal comfort in a building whose HVAC system has been adjusted to reduce building energy usage by raising the cooling set-point from 75° F. to an uncomfortable 79° F., and by lowering the heating set-point 70° F. to 66° F. would enable energy savings whose present value is over $200 per person at an interest rate of 5%.

EXAMPLE 2

Figure 4:
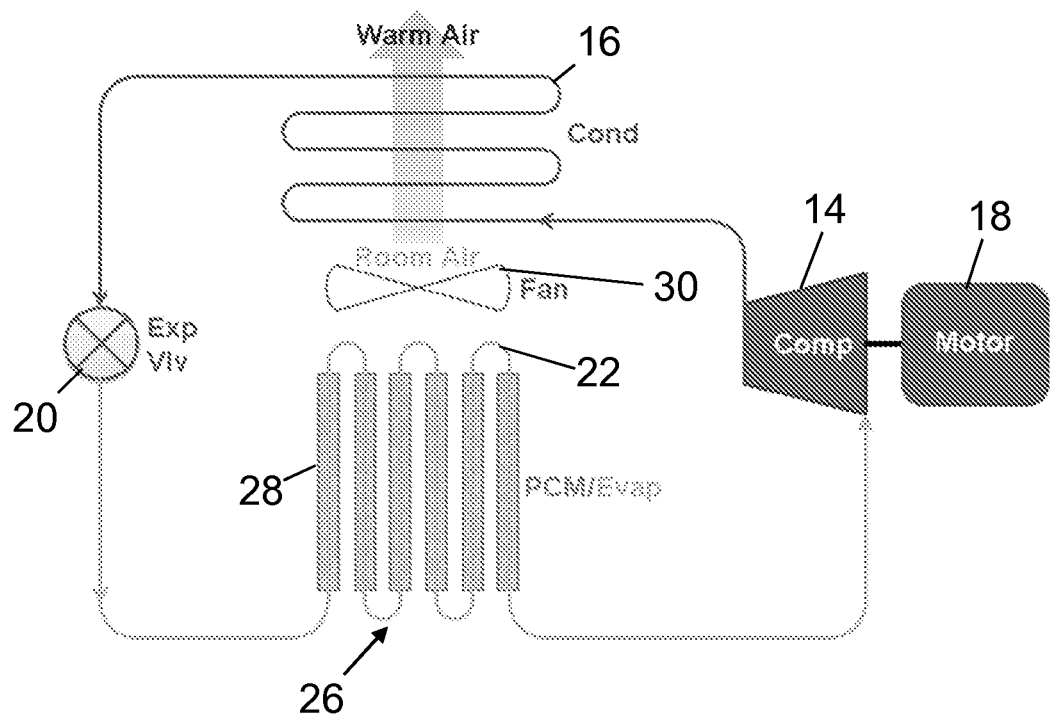
FIG. 4 is a simplified flow diagram of a micro vapor compression system according to the present invention in the PCM freezing mode.
Figure 5:
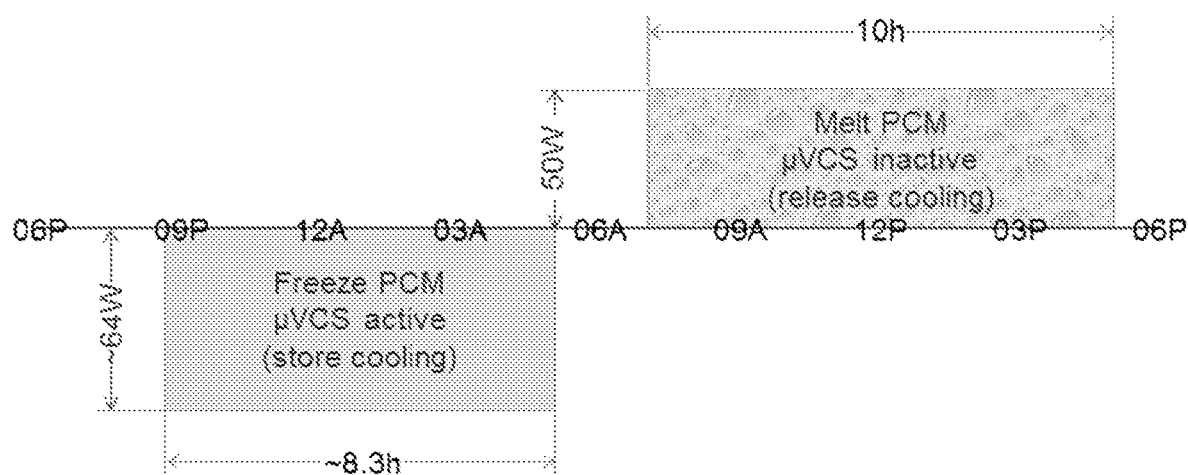
FIG. 5 is a typical operating cycle of a micro environmental control system in the cooling (PCM freezing) mode according to the present invention.
Figure 6:
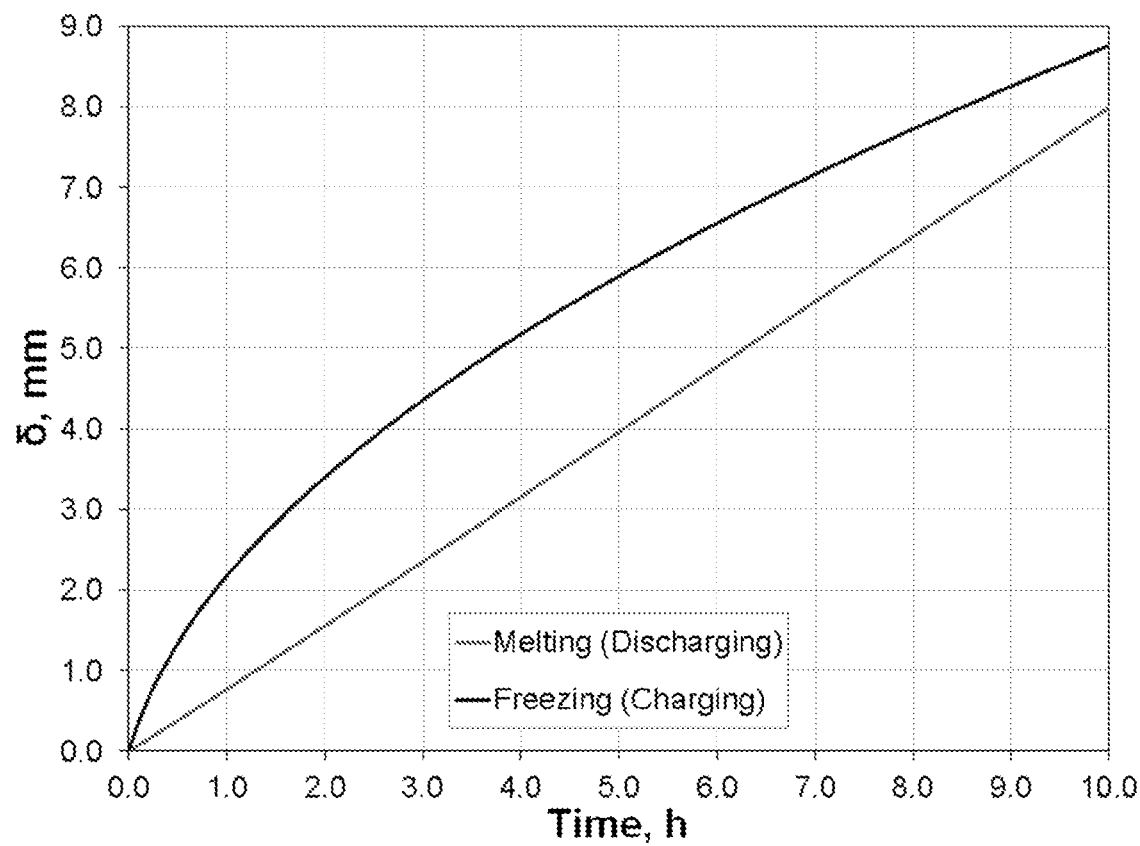
FIG. 6 is a graph of the melting and freezing curves for a phase change material module for a micro environmental control system in the cooling mode according to the present invention.
Figure 7:
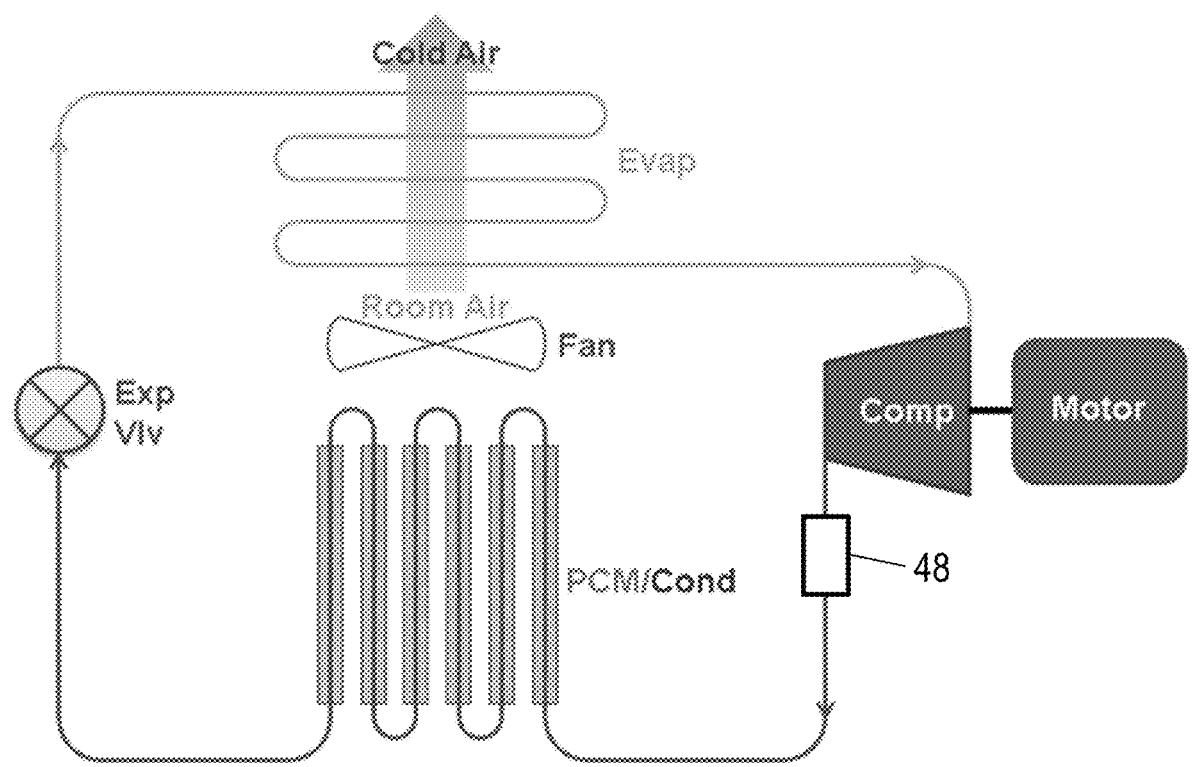
FIG. 7 is a simplified flow diagram of a micro vapor compression system having in the reversed heat pump mode according to the present invention(reversing valve not shown)
Figure 8:
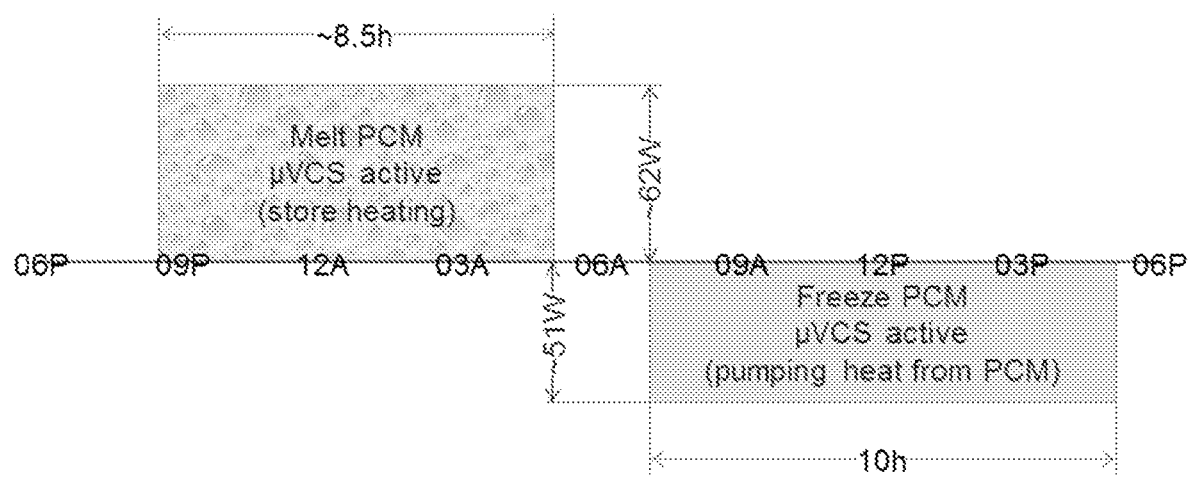
FIG. 8 is a typical operating cycle of the a micro environmental control system in the heating (heat pump) mode according to the present invention.
Figure 9:
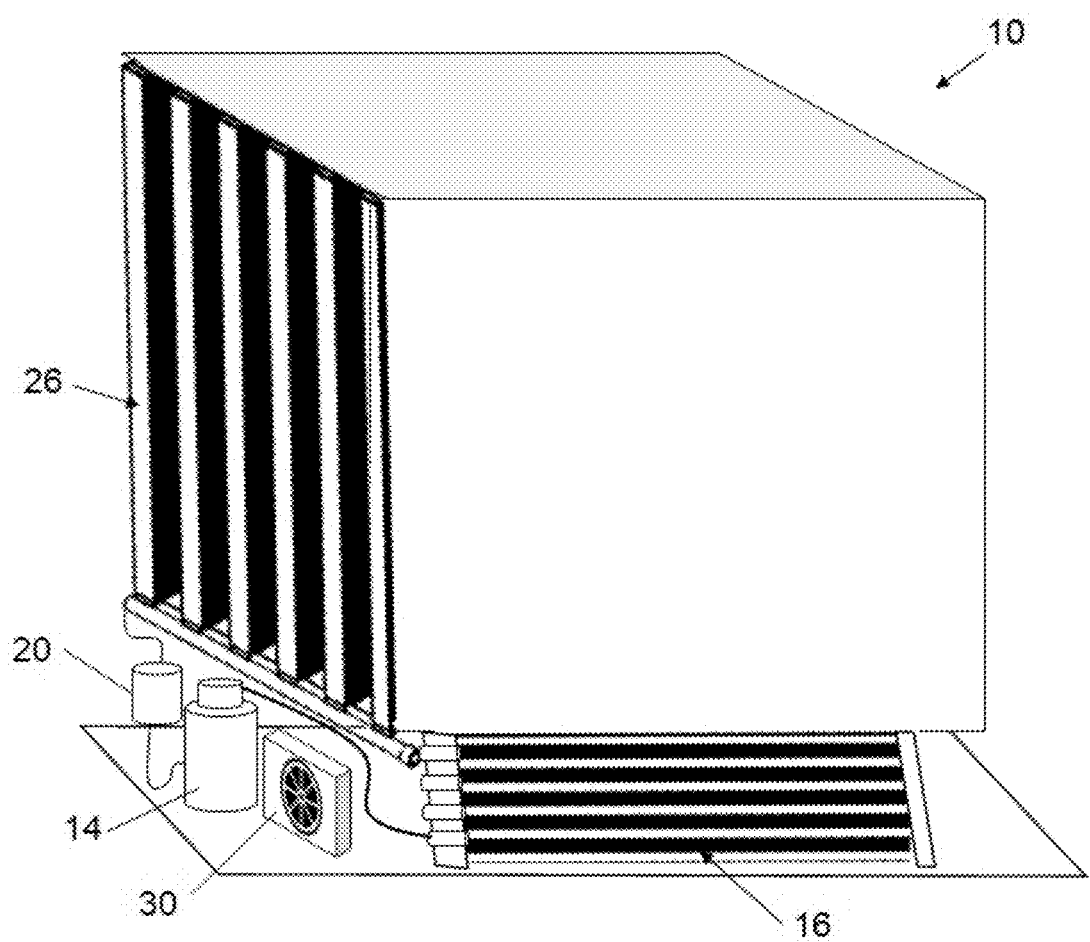
FIG. 9 is an isometric depiction of a typical assembled micro environmental control system with skin removed to reveal internal components.

In another embodiment of the invention, a compact micro environmental control system can supply ~50 W of cooling to the near-range PµE in the cooling season, and add >60 W of heating to the near-range PµE in the heating season for up to 10 hours of occupancy in a typical office setting. For cooling, the µX uses a micro vapor-compression system (µVCS) that is operated automatically only during the un-occupied period to freeze a phase-change-material (PCM) in a thermal storage module. FIG. 4 depicts a simplified flow diagram of such a system and FIG. 5 shows a typical operating cycle in the cooling season and FIG. 6 shown the associated freezing and melting curves. The evaporator of the µVCS (FIG. 2) is embedded in the PCM module (FIG. 3). One or two small quiet fans move an average of ~20 cfm of air over the PCM to deliver cool air at an average temperature of ~71° F. to the PµE during occupancy period (50 W of cooling) through an air terminal device (ATD). In this configuration, >60 W heating is provided very efficiently by operating the µVCS during occupancy period as a heat pump that withdraws heat from the PCM to freeze it, while delivering warm air that is blown over the µVCS condenser, rather than by a much less efficient electric heater integrated into the condenser as is the case in the aforementioned EXAMPLE 1. The same small fan(s) move the air either over the condenser or through the PCM module, depending on the operating mode. In the heating mode, the PCM will be melting at night by operating the heat pump in reverse mode as shown in FIG. 7 using a reversing valve 48. A typical operating cycle in the heating mode is shown in FIG. 8. This µX will be self-contained, automated, quiet, ergonomic, and conforms to OSHA standards. It will be designed to be installed unobtrusively under a desk. There is seen in FIG. 9 an isometric depiction of an overall design for the µX, in which the PCM module is configured as a number of parallel vertical slabs with an embedded micro-channel evaporator and air flow passages in between. The entire system will fit in a box about the size and shape of a desk-top computer (<1.5 ft³), and will weigh less than 35 lbs.

In the cooling mode, the µVCS will start automatically and run for ~8.5 hours during the un-occupied night-time to freeze the PCM (to store cooling in it) as shown in FIG. 5. In this operating mode, the air blown by the fans will be directed at the condenser of the µVCS to reject its heat into the unoccupied space. A set of automatic dampers will allow room air to flow over the µVCS condenser, and another synchronized set of automatic dampers will block room air blown by the fans from entering the PCM module while the µVCS is operating to prevent heat transfer from the warm room air to the PCM during freezing. The µVCS will automatically shut down before the person starts work in the morning. When the person is at his/her desk, the system will automatically turn on the fans and direct the air to flow through passages in the PCM module, and cool it before delivering it to the PµE through the ATD. During occupancy, the PCM module dampers will be automatically opened and those of the condenser will be automatically closed, thus forcing the room air to flow through the PCM module passages and be cooled by melting the PCM over a 10-hour period. In the heating mode, room air will be blown over the condenser of the operating µVCS and delivered to the PµE during 10 hours of occupancy. In the heating mode, the PCM dampers will be automatically closed and the condenser dampers will be automatically opened with the fans blowing room air over the condenser to heat the air to a more comfortable level. Although the µX is designed for automatic operation, the occupant can override the µX automation and operate the system to his/her liking. The controller also allows the system to shut off when the person is not at the desk.

In the cooling mode, the µVCS will start automatically at night and provide ~60 W of cooling to freeze the PCM over approximately a 8.5-hour period. With a refrigeration COP of >5.0, the µVCS will use <12.5 W for ~8.5 h. This is equivalent to <11 W, including fan power, if averaged over the 10 hours of occupancy. Higher- or lower-capacity µVCS may be employed to shorten or lengthen the PCM charging period. With a robust 50 W of cooling capacity, computational fluid dynamics (CFD) analysis indicates that µX will make possible the removal of >25 W of total heat from a seated occupant in the cooling season. In the heating mode, the power consumption will be ~16.5 W for delivering >60 W of heat during 10 hours of occupancy.

The use of the thermal storage PCM module in the µX allows us to shift the operation of the µVCS to the night hours when the office is not occupied. This avoids two of the major drawbacks of installing an active VCS heat pump very close to the occupant: 1) warm exhaust from the condenser of an operating VCS will not be discharged into the occupied space during occupancy, and 2) cold air will not be discharged into the occupied space during occupancy. Further, some electric utilities that employ time-of-day pricing may offer lower rates at night or other peak-shaving incentives.

Referring to FIGS. 2 and 3, each of the slabs of the PCM may have an embedded micro-channel evaporator. The PCM slabs are contained in an aluminum or plastic. The refrigerant zigzags from end to end through the evaporator passages, then bridges externally from one slab to the next. The PCM module of FIG. 3 was designed to allow nearly linear melting over the span of 10 hours Referring to FIG. 6, typical melting and freezing curves for a PCM slab of the present invention are shown. Table 1 below sets forth typical characteristics for a PCM module:

TABLE 1

| Module Geometry | Value | Unit |
| --- | --- | --- |
| Number of Slabs | 6 | |
| Slab thickness | 0.019 | m |
| PCM thickness | 0.017 | m |
| Slab width | 0.400 | m |
| Slab pitch | 0.0348 | m |
| Slab vertical length | 0.309 | m |
| Air passage width | 0.0154 | m |
| Air flow rate | 20.0 | cfm |

It can be seen that the PCM module is quite compact and can easily fit under a desk. Because of the slight non-linearity of the melting curve, small adjustments may have to be made to the air flow to ensure uniform delivery of 50 W of cooling over the 10-hour time span. In the configuration of FIG. 3, air flows in gaps between the encased PCM slabs. Over the 10-hour period, on average ~20 cfm of air will flow through the PCM module gaps using 1 or 2 low-power (<1 W total) quiet fans. The air is drawn from the room at the 79° F., cooled by the PCM to an average ~71° F., then discharged from the PCM module.

In the cooling mode, the μVCS in the μA will operate only during times of no-occupancy (at night) to provide ~60-65 W of cooling for freezing the PCM in ~8.5 hours, i.e., to store enough cooling at night for later use at the rate of 50 W during a 10-hour workday. The evaporator of the μVCS will be embedded in the PCM module. Owing to the high heat transfer coefficient of the refrigerant forced convection boiling inside the evaporator passages, the saturated evaporator temperature (SET) can be raised to a more-efficient ~61° F., i.e., ~3° F. below the 64° F. PCM freezing temperature. Not only will this allow for a higher and more efficient SET, but also it avoids the problem of indoor moisture condensation on the evaporator surface and associated condensate management challenges when the indoor dew point is higher than 61° F., as it is likely to be with a 79° F. indoor dry-bulb thermometer and 60% RH. With the μVCS active only at night when the space is unoccupied, the condenser heat will be rejected into the 79° F. unoccupied space, allowing the saturated condenser temperature (SCT) to be lowered to a more efficient 95-100° F., or possibly lower.

In the heating season, the μVCS may be operated during the day to provide heating (heat rejected from the condenser), while freezing a phase-change material (PCM) in the same manner as μVCS is operated during the night in the cooling season, as seen in FIG. 4. At night, operation may be reversed using the reversing valve, so that heat will be pumped from the room (at 66° F.) into the PCM-embedded evaporator operated as a condenser to melt the PCM, as seen in FIG. 7. This arrangement provides heating at a much higher COP than the electric heater. As the compressor must be operated during occupancy periods, extra sound insulation may be used to reduce noise. Operated in the heat pump mode during the heating season, this system will deliver more than 600 W-h of heating over a 10 hour occupancy period while consuming less than 165 W-h of electricity during the combined day and night freezing and melting cycles (FIG. 8).

An important factor in the design of the μVCS is the selection of an appropriate, environmentally-safe refrigerant. Hydro-fluoro-carbon (HFC) refrigerants are by far the most common. They have zero ozone depletion potential (ODP) but, if leaked in the atmosphere, their global warming potential (GWP) is more than 1000 times that of $CO_2$. Hydrocarbons such as iso-butane and iso-pentane have been proposed as zero-ODP, low-GWP refrigerants but their flammability limits their use to small systems such as household refrigerators, which makes them potential candidates for the proposed μVCS. Other refrigerants under development are hydro-fluoro-olefins (HFO). Of particular interest for the proposed μVCS are low-density, low-pressure refrigerants, such as those suitable for centrifugal chillers. This is because the challenge in the design of a μVCS is the small volumetric flow rates, which drive down the size of the compressor and the heat transfer equipment to impractically small dimensions if dense refrigerants are used. Therefore, the present invention focused on low-pressure refrigerants such as R245fa, iso-pentane (R601a) and some of the new low-pressure HFO (e.g., R1233zd).

What is claimed is:

1. A micro environmental control system, comprising:
a micro vapor compression system having a compressor, a condenser coupled to the compressor, an expansion valve coupled to the condenser, a reversing valve, and a refrigerant circulating through the micro vapor compression system;
a thermal storage module including a solid-liquid phase change material and an evaporator that is embedded in the solid-liquid phase change material and coupled to the expansion valve;
at least one fan positioned to selectively direct a stream of air through the solid-liquid phase change material or over the condenser; and
a controller coupled to the compressor and the fan that is programmed to operate the micro environmental control system in a cooling mode wherein the compressor is operated to cool the solid-liquid phase change material during a first predetermined time period, and the fan is operated to direct the stream of air through the solid-liquid phase change material during a second predetermined time period.

2. The micro environmental control system of claim 1, wherein the first predetermined time period is during the night and the second predetermined time period is during the day.

3. The micro environmental control system of claim 2, further comprising a heater associated with the condenser.

4. The micro environmental control system of claim 3, wherein the controller is further programmed to operate the micro environmental control system in a heating mode where the fan directs air over the heater.

5. The micro environmental control system of claim 4, further including a set of dampers associated with the fan to selectively direct the stream of air through the solid-liquid phase change material or over the condenser.

6. The micro environmental control system of claim 1, wherein the system is configured for operation as a heat pump.

7. The micro environmental control system of claim 6, wherein the controller is programmed to operate the micro environmental control system in a heating mode wherein the micro vapor compression system operates to freeze the solid-liquid phase change material during a first predetermined operating period of the heating mode while the fan is operated to direct a stream of room air over the condenser, and is programmed to operate the micro vapor compression system in reverse to melt the solid-liquid phase change material during a second predetermined operating period of the heating mode.

8. A method of providing micro environmental control, comprising the steps of:
providing a micro vapor compression system having a compressor, a condenser coupled to the compressor, an expansion valve coupled to the condenser, a reversing valve, and a refrigerant circulating through the micro vapor compression system; a thermal storage module including a solid-liquid phase change material; an evaporator embedded in the solid-liquid phase change material; a fan positioned to selectively direct a stream of air through the solid-liquid phase change material; and
using a controller to operate the unit in a cooling mode by cooling the solid-liquid phase change material during a first predetermined time period, and using the fan to direct the stream of air through the solid-liquid phase change material or over the condenser during a second predetermined time period.

9. The method of claim 8, wherein the first predetermined time period is during the night and the second predetermined time period is during the day.

10. The method of claim 9, further comprising the step of providing a heater associated with the condenser as part of the unit.

11. The method of claim 10, further comprising the step of operating the unit in a heating mode where the fan directs air over the heater.

12. The method of claim 11, wherein the step of providing a unit further includes providing a set of dampers in the unit that are associated with the fan to selectively direct the stream of air through the solid-liquid phase change material or over the condenser.

* * * * *